United States Patent [19]
Pereault

[11] 3,779,327
[45] Dec. 18, 1973

[54] MUFFLER ASSEMBLY FOR SNOWMOBILES

[75] Inventor: Jules Pereault, Valcourt, Quebec, Canada

[73] Assignee: Bombardier Limited, Valcourt, Quebec, Canada

[22] Filed: Mar. 17, 1972

[21] Appl. No.: 235,674

[52] U.S. Cl. ............................ 180/5 R, 180/64 A
[51] Int. Cl.. B62m 27/02, B60k 13/06, B60k 13/04
[58] Field of Search ........................... 180/5 R, 64 A

[56] References Cited
UNITED STATES PATENTS

| 1,110,040 | 9/1914 | Chatain | 180/64 A |
|---|---|---|---|
| 2,529,995 | 11/1950 | Brezek | 180/54 A |
| 2,289,768 | 7/1942 | Fehrenbacher | 180/5 R |
| 3,559,611 | 2/1971 | Cushman | 180/5 R |

FOREIGN PATENTS OR APPLICATIONS

| 743,439 | 12/1943 | Germany | 180/64 A |
|---|---|---|---|

Primary Examiner—Richard J. Johnson
Attorney—Robert B. Larson et al.

[57] ABSTRACT

The disclosure herein describes a muffler assembly consisting of a cover for completely enclosing the muffler of a snowmobile-like vehicle over an aperture provided through the frame of the vehicle. The cover provides a heat barrier between the muffler and the other surrounding components located under the hood of the vehicle while the frame aperture allows air and snow circulation around the muffler inside the cover. To cut down on the intensification of vibration, in a first alternative, the muffler cover and the frame are separated from one another by vibration attenuating means. In another alternative, the muffler cover is fixed directly on the frame and the vibration attenuating means are disposed betwen the muffler and the cover.

9 Claims, 6 Drawing Figures

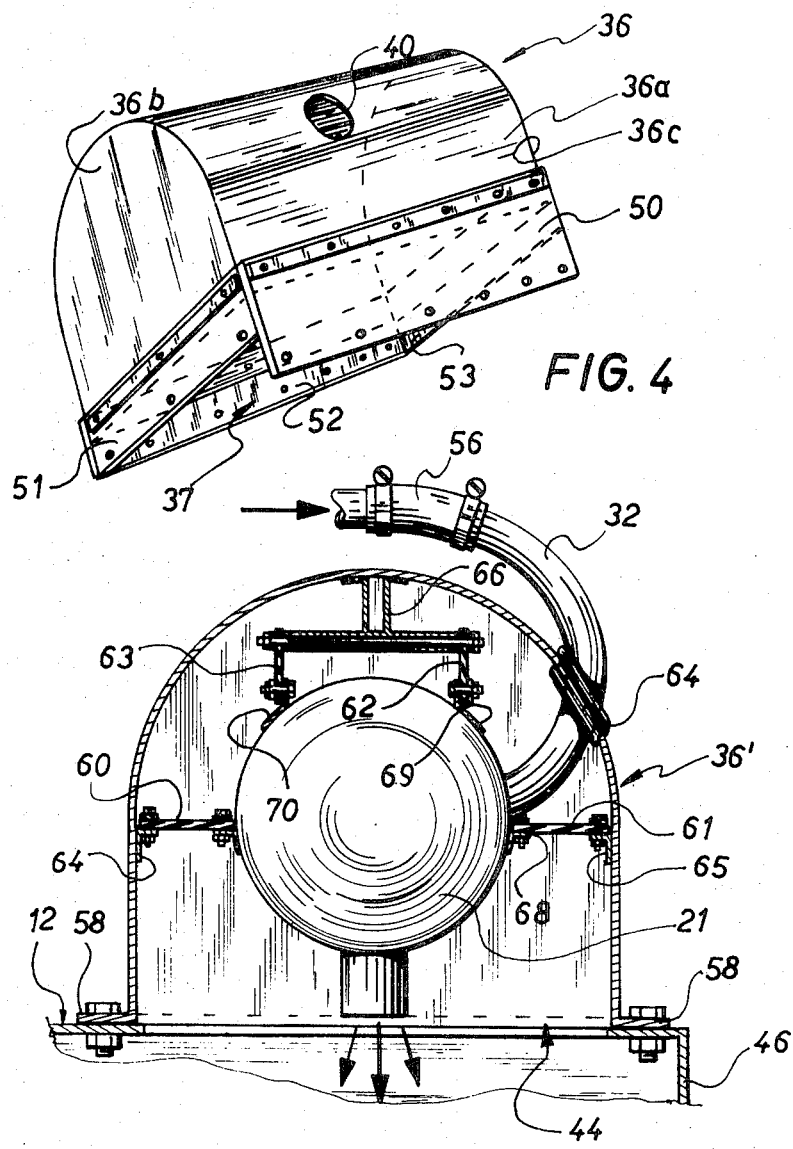

MUFFLER ASSEMBLY FOR SNOWMOBILES

The present invention relates generally to mufflers; more particularly, this invention pertains to a muffler assembly for use in a snowmobile-like vehicle.

Snowmobiles are by now well known vehicles comprising a longitudinally extending frame, the front portion of which supports a hood which houses the engine and other components, the under portion of which allows the running of an endless flexible track serving to propel the vehicle. The other components disposed under the hood are the fuel tank, the steering mechanism and the muffler which is connected to the engine by means of one or more exhaust tubes for the passage of the gases from the engine to the muffler.

In the past, little concern has been given to the fact that the snowmobile is a noise-producing vehicle; however, recent strict governmental regulations concerning noise reduction, have resulted in many changes in the design of certain parts of the snowmobile. In general, there has been a tendency to completely enclose the hood by blocking the driver's side of the hood by means of a console. Furthermore, on some snowmobiles, the inner walls of the hood have been covered with layers of sound attenuating material. Theoretically, the noise level produced by a snowmobile could be greatly lowered if baffles were installed on the muffler; however, this would result in a muffler of considerable size. One disadvantage in completely enclosing the inside of the hood and in providing a large size muffler is that there is a danger of overheating some of the surrounding components, for example, the fuel lines through which gas is sucked from the fuel tank to the carburetor. However, the fuel mixture should always remain liquid until it enters the air stream in the carburetor bore where it vaporizes and mixes uniformly with the incoming air; the volatility of the fuel mixture affects the starting facility, the length of warm-up period and the engine performance during normal operation. Therefore, if the percentage of volatile element is too high as a result of overheating, it will produce a vapor lock effect which is caused when fuel is vaporized in the system before entering the carburetor throat.

A further disadvantage which results from having too large a muffler is the risk of having some components, such as the fuel lines or the electrical circuits, coming into contact with the heated muffler.

It is an object of this invention to provide a muffler assembly which overcomes the above disadvantages of overheat an size while still permitting an appreciable reduction in noise level on snowmobiles.

It is also an object of this invention to provide the muffler of a snowmobile with a cover which completely encloses the muffler, thus providing a heat barrier between the muffler and the surrounding components located under the hood of the vehicle.

It is yet another object of this invention to provide a muffler assembly on a snowmobile where the muffler is cooled by means of air and snow circulating through an aperture in the vehicle frame and between muffler and cover.

The present invention therefore relates to a muffler assembly for use in a snowmobile-like vehicle including a frame having an aperture therethrough, an engine fixedly mounted on the frame and exhaust gas conduit means connected to the engine, comprising, in combination, a cover having enclosing top and sidewalls and an open bottom, the cover being mounted on the frame over the aperture; a muffler contained in the cover; and securing means for mounting the muffler to the cover; the walls including port means for allowing connection of the exhaust gas conduit means from the muffler to the engine.

In a first embodiment of the invention, the cover is mounted on the frame but separated therefrom by vibration attenuating means.

In another embodiment of the invention, the cover is directly secured to the frame and the muffler and cover are separated from one another by vibration attenuating means.

Referring to the drawings, which illustrate the invention, and in which like reference numerals indicate like parts throughout the several views:

FIG. 4 is a bottom perspective view of the cover;

FIG. 6 is a cross-sectional view of a muffler assembly showing another embodiment of the present invention.

Figure 1:
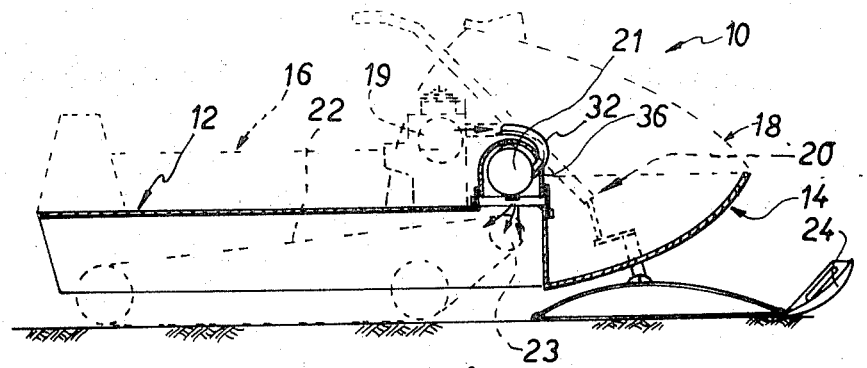
FIG. 1 is a side elevational view, partly schematic and partly cross-sectional, of a snowmobile-like vehicle having a muffler assembly made in accordance with the present invention.

Referring to FIG. 1, a conventional snowmobile 10 is shown as comprising an elongated frame having an inverted U-shaped rear portion 12 and an upwardly inclined front portion 14. A seat 16 is located over the rear portion 12 while a hood 18 extends over the frame at the front thereof. On most snowmobiles, the hood usually encloses an engine 19, a fuel tank (not shown), a steering mechanism 20, a transmission system (not shown) and a muffler 21 which is connected to the engine by means of a tube which collects the exhaust gases from the engine and directs them to the muffler 21. The frame portion 12 extends over an endless flexible drive track 22 that is entrained over a drive sprocket 23; the frame portion 14 extends over at least one ski 24 appropriately connected to the steering column 20.

The present invention is principally concerned with reducing the noise level generated by the exhaust gases as mentioned above. One way of reducing the noise is to completely enclose the hood 18; however, as indicated, this results in drawbacks such as causing a vapor lock effect in the carburetor and a overheating of the other components located under the hood either through direct contact or through radiation.

The present invention consists in disposing between the muffler and the other components a thermal barrier.

Figure 2:
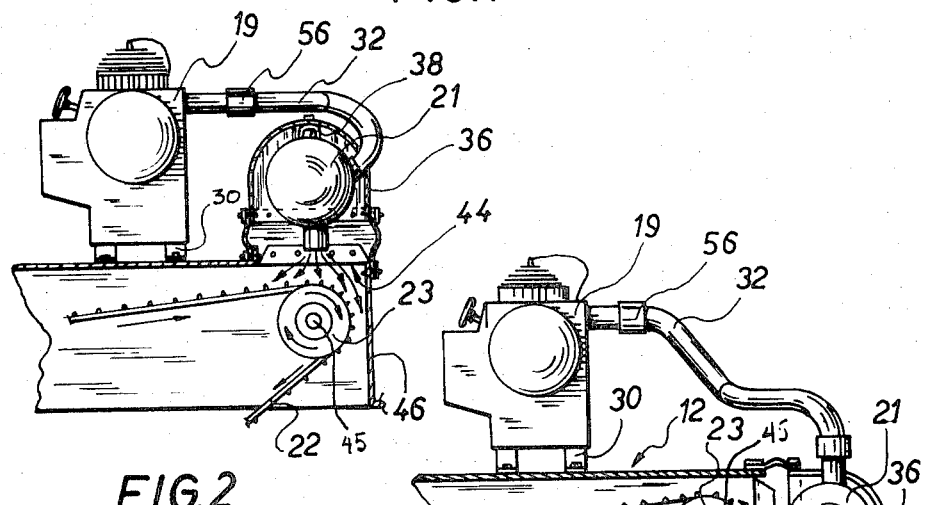
FIG. 2 is an enlarged side elevational view, partly cross-sectional, of the muffler assembly of FIG. 1.
Figure 5:
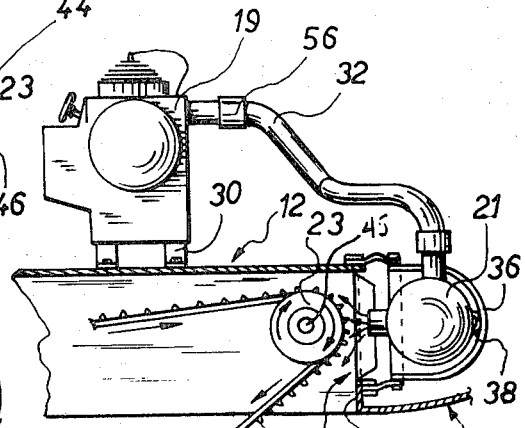
FIG. 5 illustrates a different emplacement of a muffler assembly made in accordance with the present invention and is shown on the sheet illustrating FIGS. 1–3.
Figure 3:
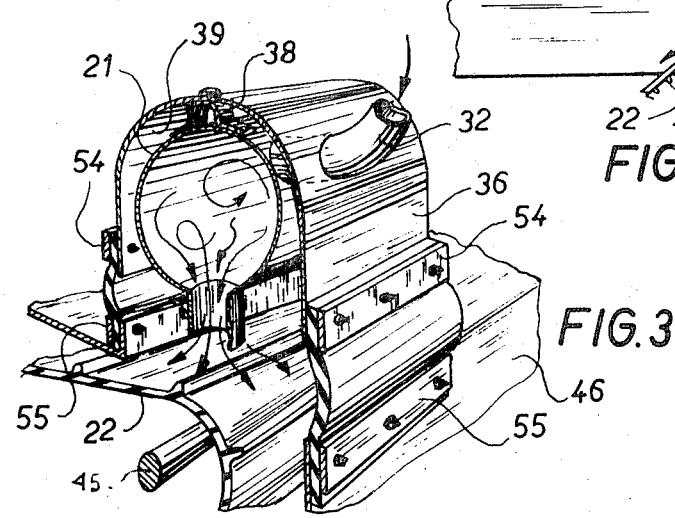
FIG. 3 is a side perspective view, partly cut away, of the muffler assembly made in accordance with the present invention.

FIGS. 2, 3 and 4 illustrate a first embodiment of the present invention. For clarification purposes, these figures only illustrate the components of the snowmobile which are directly associated with the present invention. The engine 19 mounted on the frame portion 12 is fixedly secured to the top surface thereof by appropriate fastening means 30. On most snowmobiles, the engine is of the internal combustion type and is usually a two-cycle engine with either a single cylinder or two cylinders. Therefore, depending on the engine used, there are one or two exhaust tubes 32 which connect the engine 19 to the muffler 21. The muffler is completely contained in a cover 36 having a top 36a, and sides 36b and 36c defining a generally rectangular box-like figure with an open bottom 37. Fastening means, such as bracket 38, fixedly secures the muffler 21 to the inner face 39 at a distance therefrom to allow air and snow circulation around the muffler 21. The top or sides of the cover are provided with one or two ports 40 for the passage of the exhaust tube or tubes therethrough. The cover extends over an aperture 44 provided on the top surface of the frame portion 12. Preferably, this aperture 44 has a sufficiently large area to allow optimum air and snow circulation inside cover 36 and around muffler 21 thereby effecting direct cooling of muffler and cover by the air and snow collected and circulated due to the rotational movement of the track around sprocket wheel 23. In the embodiments illustrated in the drawings, the area of aperture 44 is substantially equal to the area of the open bottom 37 of the cover and is directly located over the drive sprocket axle 45.

FIG. 4 illustrates that the cover may be mounted on wall 46 separating the frame portion 12 from the frame portion 14. Again, the aperture 44' is located adjacent drive sprocket wheel 23.

In order to cut down on the intensification of vibration which exists between the muffler and the snowmobile, a connecting member made of elastomeric material, being vibration attenuating, is disposed between the lower edges of the cover and the top surface of the frame. This member may be in the form of a continuous band completely surrounding and enclosing the lower portion of the cover, or in the form of a series of strips such as 50, 51, 52 and 53 as shown in FIG. 4, each having its upper part fastened to a plate 54 molded to the cover and its lower part fastened to a second plate 55 bolted to the frame portion 12. The rigidity and thickness of the elastomeric material are selected to prevent collapse of the material under the weight of the cover. Referring to FIG. 4, strip 50 has been shown to be larger than the other strips since it extends down on wall 46 to which it is bolted.

Further vibration attenuation between the muffler and the engine may be obtained by inserting rubber couplings 56 or any metallic flexible couplings in the exhaust conduit 32.

FIG. 6 illustrates another embodiment of the present invention. Cover 36' is fixedly mounted on the top surface of frame portion 12, the cover having lower flanges 58 bolted to the frame surface. However, muffler 21 is suspended to the cover 36' by means of vibration attenuating means, such as bands of elastomeric material 60, 61, 62 and 63 which have their extremities bolted to brackets 64, 65 and 66 secured to the inner face of the cover and to brackets 67, 68, 69 and 70 secured to the muffler 21. A rubber ring 64 is received in port 40 to avoid direct contact between tube 32 and cover 36'. As an alternative, cover 36' may be bolted to the side wall 46 of the frame.

Although the invention has been described above in relation to specific forms, it will be apparent to the person skilled in the art that it may be refined and varied in many ways. It is therefore wished to have it understood that the present invention is not limited in interpretation except by the terms of the following claims.

The embodiments of the invention in which an exclusive property or privilege is claimed are defined as follows:

1. A muffler assembly for use in a snowmobile-like vehicle including a frame having an aperture therethrough, an engine fixedly mounted on said frame and exhaust gas conduit means connected to said engine, comprising, in combination, a cover having enclosing top and side walls and an open bottom, said cover being mounted on said frame over said aperture; vibration attenuating means disposed along the peripheral edges of the walls of said cover adjacent the open bottom thereof, said vibration attenuating means spacing said cover from and securing said cover to said frame, a muffler contained in said cover; and securing means for mounting said muffler to said cover; said walls including port means for allowing connection of the exhaust gas conduit means to said muffler in said cover.

2. A muffler assembly as defined in claim 1 wherein said securing means are shaped so as to distance said cover from said muffler to thereby allow air and snow circulation between said muffler and said cover.

3. A muffler assembly as defined in claim 2 wherein said securing means include first bracket means fixed to the inside surface of said walls and second bracket means fixed to said muffler; and vibration attenuating means connecting said first to said second bracket means.

4. A muffler assembly for use in a snowmobile-like vehicle including a frame having an aperture therethrough, an engine fixedly mounted on said frame and exhaust gas conduit means connected to said engine, comprising, in combination, a cover having enclosing top and side walls and an open bottom, said cover being mounted on said frame over said aperture; a muffler contained in said cover; and securing means for mounting said muffler to said cover; said securing means being shaped to as to distance said cover from said muffler to thereby allow air and snow circulation between said muffler and said cover, and said securing means further including first bracket means fixed to the inside surface of said walls and second bracket means fixed to said muffler; and vibration attenuating means connecting said first to said second bracket means; said walls including port means for allowing connection of the exhaust gas conduit means to said muffler in said cover.

5. A muffler assembly as defined in claim 4 wherein the peripheral edges of the walls of said cover adjacent said open bottom are directly secured to said frame.

6. A snowmobile comprising a frame with an elongated inverted U-shaped portion; a suspended endless track mounted underneath said portion; a drive sprocket axle rotatably mounted transversely of said portion at the forward region thereof in driving engagement with said endless track; an engine located at the forward region of said portion; said frame having an aperture therethrough at the forward region thereof, a muffler assembly mounted on said frame at the forward region thereof and including a cover having top and side walls and an open bottom, said open bottom extending over said aperture, a muffler contained in said cover and spaced from the inside surface of said walls, and securing means for mounting said muffler to said cover; exhaust gas conduit means connecting said engine to said muffler; said walls of said cover including port means for allowing passage of said conduit means to said muffler in said cover; and a hood extending over said engine, conduit means and muffler assembly; said aperture being provided in said frame over said drive sprocket axle whereby air and snow collected adjacent said aperture from said track when driven by said axle are circulated inside said cover for cooling said muffler and said cover.

7. A snowmobile as defined in claim 6 wherein vibration attenuating means have one end secured to the peripheral edges of said walls adjacent the open bottom of said cover and the other end secured to said frame to thereby limit vibrations between cover and frame.

8. A snowmobile as defined in claim 6 wherein vibration attenuating means secure said muffler to the inside surface of said cover to thereby limit vibrations between muffler and cover.

9. A snowmobile as defined in claim 6 wherein said aperture has an area substantially equal to the area of said open bottom of said cover.

* * * * *